Patented Sept. 30, 1952

2,612,518

UNITED STATES PATENT OFFICE 2,612,518

PREPARATION OF ALKYL ACYLAMIDO-ACETOACETATES

John A. King, Manhasset, N. Y., assignor to Sterling Drug Inc., New York, N. Y., a corporation of Delaware No Drawing. Application March 23, 1951, Serial No. 217,293

3 Claims. (Cl. 260—482)

This invention relates to a process for preparing intermediates useful in the synthesis of amino acids.

A primary object of this invention is the provision of lower alkyl (lower aliphatic carboxylic acyl) aminoacetoacetates. These compounds have recently been found to be valuable intermediates for the preparation of amino acids (for example, see U. S. Ser. No. 524,776, filed March 2, 1944, now U. S. Patent 2,451,310, of Noel F. Albertson et al., relating to the preparation of tryptophan and similar compounds).

My invention comprises catalytically reductively acylating a lower alkyl oximinoacetoacetate in the presence of a palladium catalyst, whereby there is obtained a lower alkyl (lower aliphatic carboxylic acyl) aminoacetoacetate having the formula

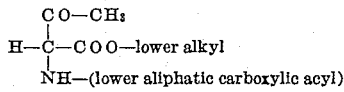

My new process can be effected conveniently by mixing a lower alkyl oximinoacetoacetate with a water-soluble lower aliphatic carboxylic acid anhydride, or with a mixture of the anhydride and the corresponding lower aliphatic carboxylic acid, and subjecting this solution to catalytic hydrogenation in the presence of a palladium catalyst. As the water-soluble acid, it is generally most convenient to employ the lower aliphatic carboxylic acid corresponding to the lower aliphatic carboxylic acid anhydride used as the acylating agent, i. e. acetic acid, propionic acid, etc. While catalytic hydrogenation using a palladium catalyst in accordance with my invention gives very satisfactory yields, on the other hand the use of a platinum catalyst leads to relatively poor yields.

My invention is illustrated by the following examples without, however, being limited thereto.

Example 1

15.9 g. of ethyl oximnoacetoacetate was dissolved in 50 ml. of acetic anhydride and the solution was diluted to 150 ml. with acetic acid. To this solution was added 1 g. of palladium charcoal catalyst and the mixture was hydrogenated at room temperature under a hydrogen pressure of 50 lbs./sq. in. The reduction was completed in about one and one-half hours. The catalyst was removed from the reaction mixture by filtration and the filtrate was evaporated in vacuo at 45–90° C. The oil obtained as a residue, which was ethyl acetamidoacetoacetate, weighed 18.7 g. It solidified when placed in contact with petroleum ether. The purified product melted at 47° C.

When treated with 2,4-dinitrophenylhydrazine, this product yielded a yellow crystalline solid which, when purified by crystallization from ethanol, melted at 198–200° C. When treated with ferric chloride solution, aqueous solutions of ethyl acetamidoacetoacetate gave a purple-red color.

Example 2

When a propionic acid-propionic anhydride mixture was used in place of the acetic acid-acetic anhydride mixture in the procedure described above in Example 1, there was obtained ethyl propionamidoacetoacetate, which melted at 54–56° C.

Although, for purposes of economy and convenience, I have employed in the above examples ethyl oximinoacetoacetate, there can be employed any other lower alkyl oximinoacetoacetate, for example the methyl, n-propyl, isopropyl, n-butyl, etc. esters, in which case the product of the catalytic reductive acylation is the corresponding lower alkyl (lower aliphatic carboxylic acyl) aminoacetoacetate.

This application is a continuation of my copending U. S. patent application Serial No. 685,906, filed July 24, 1946, now abandoned.

I claim:

1. The process for preparing a lower alkyl (lower aliphatic carboxylic acyl) aminoacetoacetate which comprises catalytically hydrogenating a mixture of a lower alkyl oximinoacetoacetate and a lower aliphatic carboxylic acid anhydride in the presence of a palladium catalyst.

2. The process for preparing ethyl acetamidoacetoacetate which comprises catalytically hydrogenating a mixture of ethyl oximinoacetoacetate and acetic anhydride in the presence of a palladium catalyst.

3. The process for preparing ethyl propionamidoacetoacetate which comprises catalytically hydrogenating a mixture of ethyl oximinoacetoacetate and propionic anhydride in the presence of a palladium catalyst.

JOHN A. KING.

REFERENCES CITED

The following references are of record in the file of this patent:

UNITED STATES PATENTS

| Number | Name | Date |
|---|---|---|
| 2,521,810 | Tishler et al. | Sept. 12, 1950 |

OTHER REFERENCES

Snyder et al.: "J. Am. Chem. Soc.," vol. 66, Mar. 9, 1944, pp. 350 to 351.